US011087562B2

(12) United States Patent
Croxford et al.

(10) Patent No.: US 11,087,562 B2
(45) Date of Patent: Aug. 10, 2021

(54) METHODS OF DATA PROCESSING FOR AN AUGMENTED REALITY SYSTEM BY OBTAINING AUGMENTED REALITY DATA AND OBJECT RECOGNITION DATA

(71) Applicants: Apical Limited, Cambridge (GB); Arm Limited, Cambridge (GB)

(72) Inventors: Daren Croxford, Swaffham Prior (GB); Roberto Lopez Mendez, Cambridge (GB)

(73) Assignees: Apical Limited, Cambridge (GB); Arm Limited, Cambridge (GB)

( * ) Notice: Subject to any disclaimer, the term of this patent is extended or adjusted under 35 U.S.C. 154(b) by 0 days.

(21) Appl. No.: 16/576,532

(22) Filed: Sep. 19, 2019

(65) Prior Publication Data

US 2021/0090348 A1    Mar. 25, 2021

(51) Int. Cl.
| | |
|---|---|
| *G06K 9/00* | (2006.01) |
| *G06T 19/00* | (2011.01) |
| *G06F 3/16* | (2006.01) |
| *G06T 19/20* | (2011.01) |
| *G06T 17/20* | (2006.01) |
| *G06K 9/62* | (2006.01) |

(52) U.S. Cl.
CPC ............ *G06T 19/20* (2013.01); *G06F 3/16* (2013.01); *G06K 9/00624* (2013.01); *G06K 9/00671* (2013.01); *G06K 9/6267* (2013.01); *G06T 17/20* (2013.01); *G06T 19/006* (2013.01); *G06T 2210/62* (2013.01); *G06T 2219/2016* (2013.01)

(58) Field of Classification Search
None
See application file for complete search history.

(56) References Cited

U.S. PATENT DOCUMENTS

| | | | | |
|---|---|---|---|---|
| 2018/0276969 | A1* | 9/2018 | Obaidi | G08G 1/005 |
| 2019/0019011 | A1* | 1/2019 | Ross | G06K 9/00671 |
| 2019/0130656 | A1* | 5/2019 | Gebbie | G06T 19/20 |
| 2019/0371145 | A1* | 12/2019 | McQueen | G06N 3/08 |

OTHER PUBLICATIONS

"Using AR and VR Technology in Health & Safety", Dec. 2019.
Sabelman et al. "The Real-Life Dangers of Augmented Reality", IEEE Spectrum, Jun. 23, 2015.
(Continued)

*Primary Examiner* — Joni Hsu
(74) *Attorney, Agent, or Firm* — EIP US LLP

(57) ABSTRACT

A method of data processing for an augmented reality system. The method comprises obtaining augmented reality data output by an augmented reality application operating at a second trust level. The augmented reality data is for modifying a representation of a real-world environment for a user of the augmented reality system. The method also comprises obtaining object recognition data determined by an object recognition system operating at a first trust level. The object recognition data comprises an indication of an object belonging to a predetermined class of objects being present in the real-world environment. The method also comprises triggering modification of the augmented reality data in response to the object recognition data, based on prioritization of the first trust level over the second trust level.

14 Claims, 3 Drawing Sheets

(56) References Cited

OTHER PUBLICATIONS

Kroc, Natalie, "Augmented Reality Comes to the Workplace", Sep. 20, 2017.
Stojadinovic, B., "Hazard Detection using Augmented Reality", Aug. 22, 1997.
Schall et al., "Augmented Reality Cues and Elderly Driver Hazard Perception", Hum Factors, Jun. 2013, 55(3): pp. 643-658.
Pennic, "PeerWell Launches Augmented Reality Trip and Fall Hazard Detector for Smartphones", https://hitconsultant.net/2018/04/18/peenwell-augmented-reality-trip-fall-hazard-detector/#.XYOEsXdFw9d, Apr. 18, 2018.
Deol et al., "An Improved Object Detection Technique for Hazard Avoidance Systems", American Journal of Applied Sciences 2018, 15 (7), pp. 346-357, Aug. 19, 2018.

\* cited by examiner

METHODS OF DATA PROCESSING FOR AN AUGMENTED REALITY SYSTEM BY OBTAINING AUGMENTED REALITY DATA AND OBJECT RECOGNITION DATA

BACKGROUND OF THE INVENTION

Field of the Invention

The present invention relates to data processing, particularly in relation to augmented reality environments.

Description of the Related Technology

Processing sensor-originated data in relation to augmented reality (AR) environments involves rendering one or more virtual objects in a physical environment to create a composite view for the user in which reality is enhanced by the one or more virtual objects. An alternative term for AR is "mixed reality", which references the merging of real and virtual worlds.

The one or more virtual objects may comprise perceptual information that covers one or more sensory modalities including, for example, visual (in the form of images, which could be text or simple icons in some cases), auditory (in the form of audio), haptic (in the form of touch), somatosensory (relating to the nervous system), and olfactory (relating to the sense of smell) information.

Overlaying the sensory information onto the physical environment can be done constructively (by adding to the natural environment) or destructively (by subtracting from, or masking, the natural environment). AR thus alters a user's perception of their real-world environment, while virtual reality (VR) replaces their real-world environment with an entirely simulated (i.e. computer generated) one.

SUMMARY

According to a first aspect of the present disclosure, there is provided a method of data processing for an augmented reality system. The method comprises obtaining augmented reality data, output by an augmented reality application operating at a second trust level, for modifying a representation of a real-world environment for a user of the augmented reality system; obtaining object recognition data, determined by an object recognition system operating at a first trust level, comprising an indication of an object belonging to a predetermined class of objects being present in the real-world environment; and triggering modification of the augmented reality data in response to the object recognition data, based on prioritization of the first trust level over the second trust level.

According to a second aspect of the present disclosure, a computing device comprises a secure sensor interface to obtain sensor data from one or more sensors; a secure output interface to control an output device; and at least one processor. The processor comprises at least one secure processor portion configured to perform secure data processing operations including: obtaining augmented reality data, output by an augmented reality application operating at a lower trust level than the at least one secure processor portion, for modifying a representation of a real-world environment for a user of the computing device; obtaining object recognition data determined by an object recognition system, operating at a higher trust level than the augmented reality application, based on the representation of the real-world environment, the object recognition data comprising an indication of an object belonging to a predetermined class of objects being present in the real-world environment; triggering modification of the augmented reality data based on the object recognition data; and outputting the modified augmented reality data via the secure output interface.

According to a third aspect of the present disclosure, a non-transitory computer-readable medium comprises computer-executable instructions which, when executed by a processor of a computing device, cause the processor to perform a method. The method comprises obtaining sensor-originated data comprising a representation of a real-world environment; generating augmented reality data for modifying the representation of the real-world environment for a user of the computing device; obtaining augmented reality guidance data determined based on an indication of an object belonging to a predetermined class of objects being present in the real-world environment; and modifying the augmented reality data based on the augmented reality guidance data.

Further features and advantages will become apparent from the following description of examples which is made with reference to the accompanying drawings.

DETAILED DESCRIPTION OF CERTAIN INVENTIVE EMBODIMENTS

Figure 1:
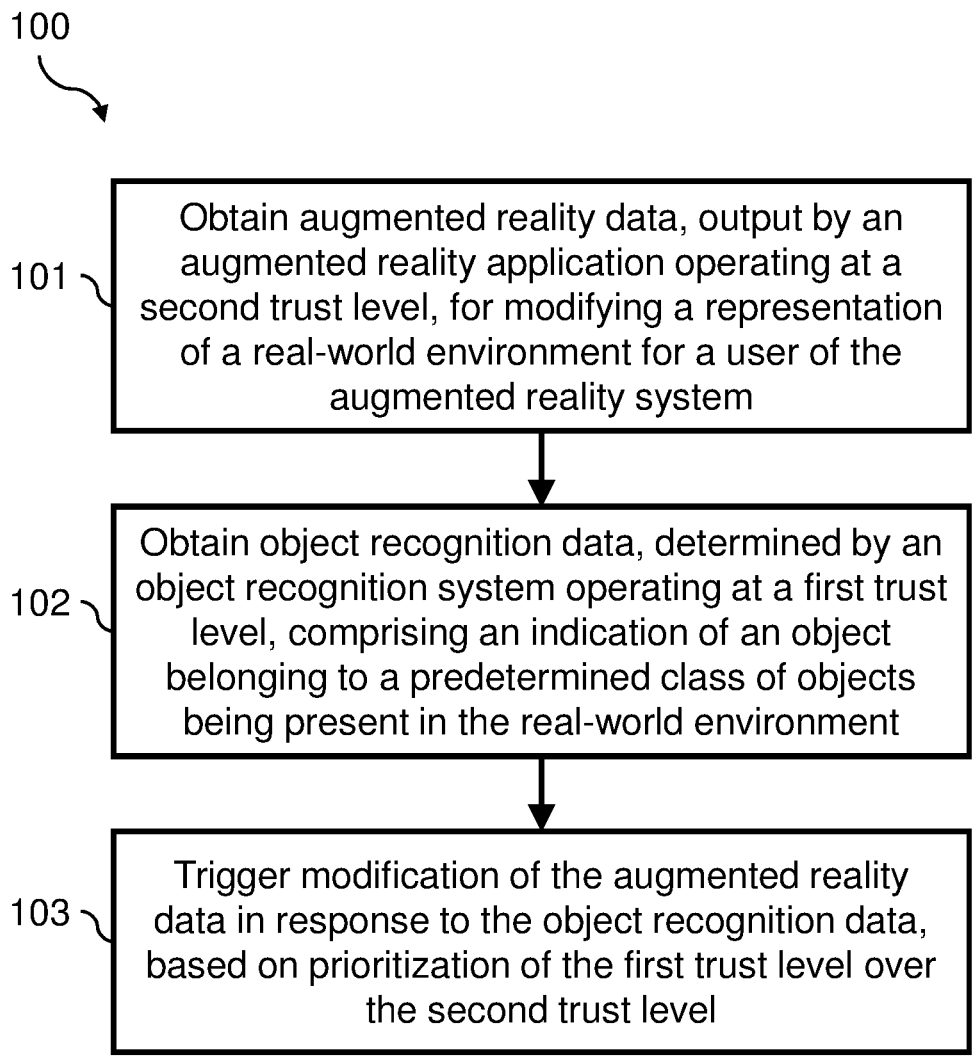
FIG. 1 shows a flow diagram illustrating a method of data processing for an augmented reality system according to examples.

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Systems and methods relating to data processing in the context of augmented reality (AR) environments are described herein. In AR environments, virtual objects, which may comprise perceptual information, are used to augment a real-world environment. A representation of the real-world environment may comprise sensor-originated data corresponding to one or more sensory modalities, e.g. visual (in the form of image data), auditory (in the form of audio data), touch (in the form of haptic data), nervous (in the form of somatosensory data), and smell (in the form of olfactory data). Thus, the virtual objects may comprise corresponding sensor-originated data for inserting into the representation of the real-world environment. For example, a virtual (or "computer generated") object comprising haptic data may be inserted into a representation of the real-world environment comprising haptic data to augment the real-world environment for the user. Virtual objects may thus comprise perceptual information covering one or more sensory modalities including, for example, visual (in the form of images, which could be text or simple icons in some cases), auditory (in the form of audio), haptic (in the form of touch), somatosensory (relating to the nervous system), and olfactory (relating to the sense of smell) information.

The sensor-originated data may be representative of a physical quantity measurable by a sensor. A sensor may be a device configured to measure a physical quantity, such as light, depth, motion, sound, etc. and convert it into a signal, e.g. an electrical signal. Examples of sensors include image sensors, tactile sensors, depth sensors, motion sensors, and microphones. For example, an image sensor may convert light into a digital signal. The sensor-originated data associated with an image sensor may therefore comprise image data representative of an image captured by the sensor. However, in other examples the sensor-originated data may additionally or alternatively comprise audio data representative of sound (e.g. measurable by a microphone), or another kind of sensor-originated data representative of a different physical quantity (e.g. haptic, somatosensory or olfactory data) measurable by a corresponding type of sensor. Sensor-originated data may be source data, or "raw data", output directly from a sensor (e.g. sensor data) in some cases. In such cases, the sensor-originated data may be obtained from the sensor, e.g. by direct transfer of the data or by reading the data from intermediate storage on which the data is stored. In other cases, the sensor-originated data may be preprocessed: for example, further processing may be applied to the sensor-originated data after it has been obtained by the sensor and before it is processed by a processor. In some examples, the sensor-originated data comprises a processed version of the sensor data output by the sensor. For example, the raw sensory input may be processed to transform low-level information into higher-level information (e.g. extracting shapes from image data for object recognition).

FIG. 1 is a flow diagram showing a method 100 of data processing for an augmented reality (or "AR") system according to examples. The data processing method 100 of FIG. 1 may be implemented by an augmented reality system 200 such as that illustrated schematically in FIG. 2 (described in more detail below).

The method involves implementing items 101 to 103 shown in FIG. 1.

At item 101 of the method 100, augmented reality data, output by an augmented reality application 205 (e.g. shown in FIG. 2) operating at a second trust level, is obtained. The augmented reality data may be for modifying a representation of a real-world environment for a user of the augmented reality system. For example, the augmented reality data may comprise at least one of audio data or image data. The representation of the real-world environment may similarly comprise at least one of an audio representation or a visual representation. For example, image data may represent a still or moving scene in the real-world environment. Image data may depict a field-of-view of the real-world environment that is capturable by an image sensor, for example. Similarly, audio data may represent instances of sound in the real-world environment that are capturable by an audio sensor. The images and/or audio may be augmented, e.g. by an AR engine or system, to include one or more virtual objects or features when displayed, e.g. on a user device. For example, the virtual objects can be inserted into the images and/or audio to generate an augmented reality environment, e.g. at the user device. The one or more virtual objects may be overlaid into the image and/or audio, e.g. at predetermined locations or anchors, to create the AR environment, for example. As described, one or more other types of perceptual information may be used for the representation of the real-world environment and the virtual objects, e.g. haptic data, somatosensory data or olfactory data.

In examples, a virtual object may be an AR object retrievable from an object library of stored virtual objects, e.g. as part of an AR platform implemented on the user device. At least part of the object library may be stored in memory on the user device, for example. The virtual object may be represented in the form of corresponding virtual object data. Thus, the virtual object may be inserted, e.g. overlaid, into the representation of the real-world environment, e.g. comprising at least one of image or audio data, based on the virtual object data corresponding to the virtual object. Auxiliary data may be used to assist insertion of the virtual object into the representation of the real-world environment. For example, where a virtual image object is inserted into an visual representation of the real-world environment, spatial data may be applied to the virtual object data, or vice versa, in order to insert the virtual object at a determined position, orientation and/or scale in the image.

In examples, obtaining the augmented reality data may comprise intercepting the augmented reality data output by the augmented reality application 205. For example, the AR system 200 may be arranged to intercept AR data output by the AR application 205 that is intended to be output, e.g. displayed, to the user.

Figure 2:
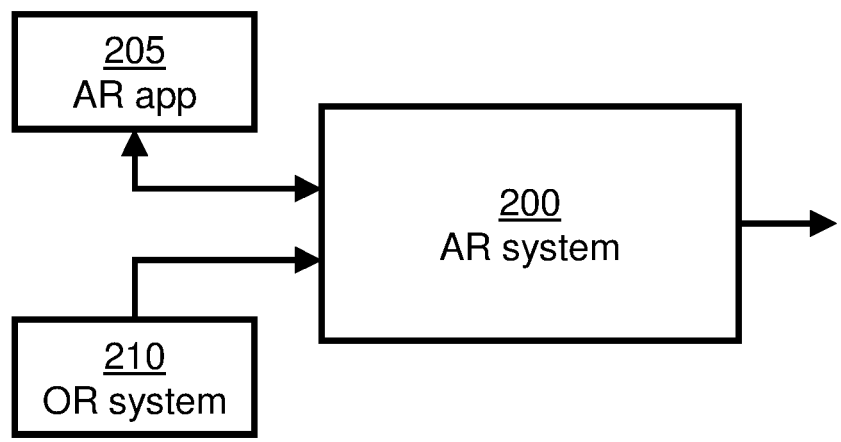
FIG. 2 shows schematically an example augmented reality system interacting with an augmented reality application and an object recognition system in accordance with the data processing methods described herein.

Item 102 of the method 100 involves obtaining object recognition data determined by an object recognition system 210, e.g. shown in FIG. 2, operating at a first trust level. The object recognition data comprises an indication of an object belonging to a predetermined class of objects being present in the real-world environment.

In examples, the first trust level comprises a secure environment. For example, the secure environment may include a trusted execution environment. The secure environment may be implemented using the TrustZone® technology developed by Arm Limited of Cambridge, UK for example, which provides mechanisms for enforcing security boundaries in a data processing apparatus such as an image processing system. The second trust level may comprise a less secure environment, e.g. than the first trust level.

The trust level of a component in a system may determine how much access the component has to certain data or other components, e.g. certain storage, in the system. For example, components within the secure environment (or "secure domain") may be trusted within a data processing system (e.g. comprising the augmented reality system) and therefore allowed access to security-sensitive data, e.g. within the data processing system. Components outside the secure environment (e.g. in a less secure environment or a "non-secure domain"), however, may not allowed access to such security-sensitive data. For example, components in the secure environment may have access to certain storage, e.g. secure or "protected" memory regions, which are not accessible to components and systems outside of the secure environment. For example, components and devices performing non-secure operations can be prevented from accessing any storage, e.g. region of memory, which is defined as being secure. Components within the secure environment, e.g. which may perform secure data processing operations, may however access at least some (and in certain cases all) of the secure storage. Certain storage, e.g. non-secure storage, may exist outside of the secure environment, to which components outside of the secure environment, e.g. in a non-secure environment, may access. In some cases, components within the secure environment may also access such non-secure storage, e.g. in addition to any access to secure storage. For example, a storage device may be divided into regions of different trust levels, e.g. a secure region and a non-secure region. Access to the different regions by a component may therefore depend on the trust level of the component. For example, components within the secure environment may access both secure and non-secure regions, whereas components outside of the secure environment may only access the non-secure region. As described above, such divisions and access controls may be implemented using an embedded hardware technology such as TrustZone® by Arm®.

The object recognition system 210 (or "object detection system", "object identification system", "object classifier") may be configured to detect instances of objects of a certain class in the real-world environment, e.g. image/audio representations thereof. For example, the object recognition system 210 may obtain sensor-originated data, e.g. image and/or audio data, as input and determine whether one or more objects of a predetermined class are present in the sensor-originated data or the real-world environment represented thereby. For example, where the predetermined class is human faces, the object recognition system 210 may be used to detect the presence of a human face in the sensor-originated data or the real-world environment. In some cases, an object recognition system allows particular instances of the object to be identified. For example, the instance may be a particular human face. Other examples of such object recognition include recognizing, or detecting, instances of expressions (e.g. facial expressions), gestures (e.g. hand gestures), audio (e.g. recognizing one or more particular sounds in an audio environment), heat signatures (e.g. recognizing objects such as faces in an infrared representation or "heatmap"). Thus, in examples, the type of "object" being detected may correspond with the type of representation of the real-world environment. For example, for a visual or image representation of the real-world environment, the object recognition may involve recognizing particular articles, expressions, gestures, etc. whereas for an audio representation of the real-world environment the object recognition may involve recognizing particular sounds or sources of sound. In some examples, the object recognition may involve detecting a motion of a recognized object. For example, as well as recognizing an instance of a particular type of object, e.g. a car, in the audio/visual representation of the real-world environment, the object recognition system 210 may also detect or determine a motion of the instance of the object, e.g. the recognized car. Thus, the object recognition data may include object motion data, e.g. representative of a detected or determined motion of the object in the real-world environment.

In examples, the object recognition system 210 may comprise, or implement, a support vector machine (SVM) or neural network to perform the object recognition, though many other types of object recognition system exist. The object recognition data may thus correspond to the output of an object recognition process performed by the object recognition system.

A neural network typically includes several interconnected neurons forming a directed, weighted graph in which vertices (corresponding to neurons) or edges (corresponding to connections) of the graph are associated with weights, respectively. The weights may be adjusted throughout training of the neural network for a particular purpose, altering the output of individual neurons and hence of the neural network as a whole. In a convolutional neural network (CNN), a fully connected layer typically connects every neuron in one layer to every neuron in another layer. Fully connected layers may therefore be used to identify overall characteristics of an input, such as whether an object of a particular class, or a particular instance belonging to the particular class, is present in an input (e.g. image, video, sound) as part of an object classification process.

A neural network may be trained to perform object detection, image segmentation, sound/speech recognition etc. by processing sensor-originated data, for example to determine whether an object of a predetermined class of objects is present in the real-world environment represented by the sensor-originated data. Training the neural network in this way may generate one or more kernels associated with at least some of the layers (such as layers of the neural network other than the input and output layers). Hence, the output of the training may be a plurality of kernels associated with a predetermined neural network architecture (for example with different kernels being associated with different respective layers of a multi-layer neural network architecture). The kernel data may be considered to correspond to weight data representative of weights to be applied to image data, as each element of a kernel may be considered to correspond to a weight, respectively. Each of these weights may be multiplied by a corresponding pixel value of an image patch, to convolve the kernel with the image patch as described below.

The kernels may allow features of the input to be identified. For example, in the case of image data, some of the kernels may be used to identify edges in the image represented by the image data and others may be used to identify horizontal or vertical features in the image (although this is not limiting, and other kernels are possible). The precise features that the kernels are trained to identify may depend on the image characteristics, such as the class of objects, that the neural network is trained to detect. The kernels may be of any size. A kernel may sometimes be referred to as a "filter kernel" or a "filter". A convolution generally involves a multiplication operation and an addition operation, sometimes referred to as a multiply-accumulate (or "MAC") operation. Thus, a neural network accelerator configured to implement a neural network, may include a multiplier-accumulator (MAC) unit configured to perform these operations.

After the training phase, the neural network (which may be referred to as a trained neural network) can be used to detect the presence of objects of a predetermined class of objects, e.g. in input images. This process may be referred to as "classification" or "inference". Classification typically involves convolution of the kernels obtained during the training phase with portions of the sensor-originated input, e.g. image patches of an image input to the neural network, to generate a feature map. The feature map may then be processed using at least one fully connected layer, e.g. to classify the object; although other types of processing may be performed.

Returning to the method 100 of FIG. 1, item 103 involves triggering modification of the augmented reality data in response to the obtained object recognition data, based on prioritization of the first trust level over the second trust level. For example, it may be determined from the object recognition data that a hazard, obstacle or other object of interest is present in the real-world environment, e.g. a cliff edge, an approaching vehicle moving above a threshold speed, or an obstacle positioned along the current trajectory of the user. Thus, in response to the obtained object recognition data, modification of the AR data, which is intended by the AR application 205 to be applied to the representation of the real-world environment, can be triggered.

In examples, the obtaining of the object recognition data, and the triggering of the modification, may be performed in the secure environment. The secure environment may also include a secure input interface, or sensor interface, for receiving sensor- or sensor-originated data from one or more sensors. The one or more sensors may also be secure, e.g. within the secure environment. This may allow for checking that stimuli, e.g. sensor data, being received at the one or more sensors is as expected, e.g. valid, before the sensor- or sensor-originated data is passed onto the AR application 205. For example, test stimuli may be instanced in the real-world environment for the one or more sensors to capture and send e.g. via the secure sensor interface described. The captured sensor data may then be compared to reference sensor data, corresponding to an expected response to the test stimuli, to determine whether the one or more sensors, and/or communications therewith, are working properly. Such checking, or "vetting", of the sensors and their captured data within the secure environment may reduce a likelihood of false sensor- or sensor-originated data being sent to the AR application and/or output to the user of the AR system. For example, the secure sensor vetting process may mean that only permitted data is passed to the AR application operating outside the secure domain. In some cases, the data being passed to the AR application may be altered (e.g. to remove private or sensitive information such as bank card numbers, personal details, etc.) based on object recognition performed, e.g. by the object recognition system 210, in the secure environment.

Similarly, the secure environment may also include a secure output interface for controlling one or more output devices (described in more detail below with reference to FIG. 3). This may allow for checking that the one or more output devices, and/or communications therewith, are working properly. For example, test control signals or output data may be sent to the one or more output devices, e.g. via the secure output interface. The resulting output produced may be compared with reference output, e.g. corresponding to an expected output to the test control signals or output data by the one or more output devices, to determine whether the one or more output devices, and/or communications therewith, are working properly. Such checking, or "vetting", of the output devices and their outputs within the secure environment may reduce a likelihood of false output, e.g. tampered output data, being presented to the user of the AR system.

In some cases, the method 100 involves modifying the AR data, e.g. actively within the AR system, in response to the triggering of the modification of the AR data. For example, the modifying of the AR data may comprise inserting a virtual object into the AR data to generate modified AR data. In examples, the virtual object is inserted into the AR data at a location corresponding to that at which the object, belonging to the predetermined class of objects, is detected in the real-world environment by the object recognition system. For example, the virtual object may be a visual object which is intended to highlight the recognized object to the user of the AR system. A bounding box, arrow, or other kind of shape which highlights the object may be inserted into the scene at a location corresponding to the location of the object as detected by the object recognition system, for example. An inserted bounding box object may be centered on the recognized object, or an inserted arrow object may be oriented to point at the recognized object, for example.

In some cases, the AR data already includes one or more virtual objects. For example, the AR data may include another virtual object. Each virtual object may be represented in the form of corresponding virtual object data. Thus, multiple virtual objects may be inserted into the (e.g. image or audio) representation based on the respective virtual object data corresponding to the different virtual objects. The virtual objects may be different AR objects retrievable from the object library, e.g. as part of the implemented AR platform, as described above. In some examples, multiple virtual objects may be different instances of the same AR object. For example, different versions of the same virtual object, represented by the same virtual object data, may be inserted into the image or audio data by inserting multiple different instances, or "copies", of the virtual object data.

In such cases, i.e. where the AR data includes a virtual object, modifying the augmented reality data may comprise modifying the virtual object. Modifying the virtual object may involve increasing a transparency of the virtual object, e.g. where the virtual object is a virtual image object. For example, the virtual image object may be made more transparent in the scene so that the recognized object, which may be at least partly obscured by the virtual image object, can still be seen by the user when the AR data is displayed to the user.

Additionally, or alternatively, modifying the virtual image object may involve converting a visual representation of the virtual image object to a wire-frame model. For example, the virtual image object may include surface characteristics such as texture in the AR data. The virtual image object may be converted to a wire-frame model by specifying the edges of the virtual image object or connecting constituent vertices of the virtual image object using straight lines or curves. The surface characteristics of the virtual image object may be removed, or at least not displayed, when converting the virtual image object to the wire-frame model. Converting the visual representation of the virtual image object to a wire-frame model can allow visualization of the underlying recognized object, e.g. in a similar way to increasing the transparency of the virtual image object as described.

Additionally, or alternatively, modifying the virtual image object may involve decreasing a size of the virtual image object. For example, the (relative) size of the virtual image object in the scene may be reduced such that more of the scene, e.g. more of the recognized object at least partly obfuscated by the virtual image object, can be seen by the user. In some examples, modifying the virtual image object may involve removing the virtual image object completely. In some cases, modifying the virtual image object may involve swapping the virtual image object for another, e.g. a different type of, virtual image object. For example, the virtual image object, which may at least partly obfuscate the recognized object, may be removed and replaced by a different virtual image object which highlights the recognized object (which could be a detected hazard, for example).

Additionally, or alternatively, modifying the virtual image object may involve altering a location of the virtual image object. For example, if it is determined that the virtual image object at least partly obfuscates the recognized real-world object in the AR environment, moving the location of the virtual image object can allow at least more of the recognized real-world object to be visible to the user when the AR environment is generated.

In examples, the virtual object in the AR data comprises a virtual audio object, e.g. comprising computer-generated audio. In such cases, modifying the virtual object may involve reducing a volume of the virtual audio object when the AR environment is generated. For example, the virtual audio object in the generated AR data may obscure a recognized audio object in the real-world environment. Thus, reducing the volume of the virtual audio object may allow for the recognized real-world audio object to be more perceivable to the user when the AR environment is generated.

Additionally, or alternatively, modifying the virtual audio object may involve modifying a frequency of the virtual audio object. For example, the frequency of the virtual audio object may be pitch shifted to make it more perceivable or less perceivable to the user. If the virtual audio object were to obscure a recognized audio object in the real-world environment, for example, shifting the frequency of the virtual audio object out of the audible frequency range for the user may allow for the recognized real-world audio object to be more perceivable to the user when the AR environment is generated. As another example, if the virtual audio object were to highlight a recognized audio object in the real-world environment, increasing the frequency of the virtual audio object may allow for the recognized audio object to be more perceivable to the user when the AR environment is generated.

Additionally, or alternatively, modifying the virtual audio object may involve modifying an audio source location of the virtual audio object. For example, if the virtual audio object has an associated audio source location to one side of the user's field of perception, this could cause the user to turn to that side and miss a hazard on the other side. Thus, the audio source location may be modified (e.g. brought to a more central location relative to the user) so that the user is less likely to be unaware of an identified object. The sound (or e.g. the sound field) may be manipulated so that the virtual audio object appears to come from a different location in the environment. In some examples, modifying the virtual audio object may involve removing the virtual audio object completely. In some cases, modifying the virtual audio object may involve swapping the virtual audio object for another, e.g. a different type of, virtual audio object. For example, the virtual audio object, which may at least partly obscure the recognized audio object, may be removed and replaced by a different virtual audio object which highlights the recognized audio object (which could be a detected hazard, for example).

In certain examples, the AR data output by the AR application 205 may be attempting to overlay sensory information onto the real-world environment destructively, e.g. by removing features or objects from the representation of the real-world environment. In such cases, modification of the AR data may involve at least partially reversing such destructive overlaying of sensory information. For example, where the recognized object belonging to a predetermined class of objects (e.g. a safety sign) is removed or obscured in the AR data, modification of the AR data may involve undoing the destructive change to the recognized object so that the recognized object is perceivable by the user when the AR environment is generated for the user.

In other cases, triggering modification of the AR data comprises sending a request to the AR application 205 to modify the AR data based on the object recognition data. For example, instead of, or in addition to, modifying the AR data at the AR system 200, the AR application 205 may modify the AR data using the object recognition data. The object recognition data can inform the AR application 205 of one or more detected environmental conditions, e.g. information about one or more recognized objects in the environment. The object recognition data, as well as indicating the presence of an object belonging to a predetermined class of objects in the real-world environment, may also indicate characteristics or properties of the recognized object. Such characteristics may include one or more of a speed, velocity, size, mass, density, or material of the object in the real-world environment. The characteristics may be determined or estimated based on information derivable from the representation of a real-world environment, e.g. as captured by one or more sensors. In some cases, a lookup table may be used to map a quantity or parameter, inferable from the representation, to one or more of the example object characteristics. In some examples, data relating to the characteristics or properties of the recognized object may be determined and sent to the AR application 205 separately to the object recognition data.

In examples, the method 100 may involve sending metadata, or AR guidance data, to the AR application 205. The metadata may be sent as part of, alongside, or separately to the request to the AR application 205 to modify the AR data. The metadata may comprise an indication of where virtual objects are allowed to be inserted, e.g. based on the object recognition data. For example, the object recognition process, performed by the object recognition system 210 operating at the first trust level (e.g. in the secure domain) may result in the detection of hazards in the real-world environment of the user. The AR guidance data sent to the AR application 205 may indicate characteristics of these hazards (e.g. where they are located) in the representation of the real-world environment and/or limitations on where virtual objects can be inserted in the representation (e.g. based on the location of the recognized hazard objects). The AR application 205 operating at the second trust level (e.g. in a less secure domain) can thus use the AR guidance data accordingly when modifying the AR data. In some cases, the AR application 205 may signal if it is able to use, and/or has used, the AR guidance data.

The AR application 205 may include one or more predetermined procedures configured to modify the AR data in any of the ways described above for the AR system 200, including combinations thereof. For example, the AR application 205 may have predetermined procedures for modifying the AR data based on different detected environmental conditions involving the recognized object. This example of the method therefore allows the AR application 205 to self-adjust the AR data being output and intended to be displayed to the user. In some cases, this may improve the user experience compared to the AR system 200 modifying the AR data prior to output for display. For example, the AR application 205 may have more realistic or holistic procedures for modifying the AR data in response to certain detected environmental conditions involving the recognized object. It may therefore be preferable for the AR application 205 to implement a more realistic or holistic way of modifying the AR data than the AR system 200 can achieve. In such cases, the method 100 may therefore involve obtaining the modified AR data from the AR application 205 in response to the request sent thereto.

In some examples, the method 100 may involve checking modified AR data received from the AR application 205. For example, in response to the request sent to the AR application 205, the AR application 205 may modify the AR data accordingly and return the modified AR data, e.g. to the AR system. The modified AR data may then check the modified AR data received from the AR application 205, e.g. to see that the modification of the AR data is appropriate based on the object recognition data. In some cases, the method 100 may involve modifying the modified AR data received from the AR application 205.

In some examples, modification of the AR data may be dependent on monitoring data relating to the user of the AR system. For example, the user may be wearing a wearable device, which could form part of the AR system, that can monitor the user in some way. For example, the wearable device may comprise an eye tracker capable of tracking eye position, eye movement, and/or pupil dilation of the user. In such cases, the monitoring data may comprise eye tracking data. As another example, the wearable device may comprise a heart monitor capable of monitoring a heart rate of the user. In such cases, the monitoring data may comprise heart rate data. How the AR data is modified may depend on the monitoring data. For example, it may be determined based on the monitoring data that the user is already aware of the object belonging to the predetermined class of objects, recognized by the object recognition system. For example, eye tracking data may indicate that the user is looking at the recognized object. The monitoring data may indicate that the user has responded to the recognized object. For example, heart rate data may indicate that the heart rate of the user has increased, or motion data may indicate that the user has changed direction and/or speed, in accordance with the appearance of the recognized object in the real-world environment, which in turn may indicate that the user is aware of the recognized object. In such cases, e.g. where the monitoring data indicates that the user is already aware of the object recognized by the object recognition system, the modification of the AR data may be less than if the monitoring data did not indicate that the user is aware of the recognized object, if the monitoring data indicated that the user was likely not aware of the object (e.g. where eye tracking data indicated that the user was looking away from the recognized object), or if monitoring data was not available.

In some examples, the modified augmented reality data, generated in response to the triggering of the modification, is output for displaying to the user. For example, the modified augmented reality data may be sent to an output interface, e.g. a display and/or audio interface. The display interface may generate an image or video signal based on the modified augmented reality data for transmitting to a display device. Similarly, the audio interface may generate an audio signal based on the modified augmented reality data for transmitting to an audio device. Other types of output interface may be used in correspondence with the type of output data.

In some cases, outputting the modified AR data involves outputting the modified AR data from the secure environment. For example, the modified AR data may be released from the secure environment, e.g. the trusted execution environment, so that it may be sent to or processed by components outside the secure environment, e.g. at a lower trust level. For example, the modified AR data may be sent to an output device, e.g. a display or audio device, outside the secure environment, to output the augmented reality environment, e.g. display the augmented reality environment, to the user, e.g. in image and/or audio form.

In examples, outputting the modified AR data comprises outputting the modified AR data as non-secure data. For example, at least one security feature may be applied to data that is to be secured, the at least one security feature potentially restricting access or available actions when interacting with secured data. However, not applying the at least one security feature may maintain the data as non-secure data, e.g. so that it may be released from the secure environment as described. The at least one security feature may be applied in accordance with the implemented secure environment. Applying the at least one security feature to data may retain the data within the secure environment, for example, whereas not applying the at least one security feature may allow the data to be released from the secure environment as described. In some examples, data to be secured is marked as such, e.g. using metadata, so that only certain components with a certain level of access can access the secure data. For example, a bit field or 'flag' associated with the data to be secured may be set such that access thereto is restricted based on components having the appropriate access rights (e.g. a corresponding flag). Thus, in such cases, applying the at least one security feature to at least a portion of the data to be secured may include setting a data value corresponding to the at least the portion of the data, which restricts access thereto. The data value may be a value of a flag or other data (e.g. metadata) corresponding to the at least the portion of the data. As an example, the at least the portion of the data to be secured may be flagged as secure by setting a value of a security flag associated therewith. For example, the associated security flag may be set to a predetermined value (e.g. to a value of '1' indicating that the data is secure, rather than a value of '0' which indicates that the data is non-secure). Thereafter, the secure data may only be stored in storage that is correspondingly flagged as secure, and/or may only be accessed by components, e.g. processors, which have access rights to secure data (and/or secure storage). Components may be flagged as secure, in this example, by also setting a value of a respective security flag associated therewith (e.g. to a value of '1' indicating that the component is secure) in a similar way to flagging the data as secure. Thus, secured data may only be stored to, and/or accessed by, secure components whereas non-secure data, e.g. having a corresponding security flag value of '0', may be stored to, and/or accessed by, non-secure components.

In examples, storage and/or processing of non-secure data by secure components may be restricted. For example, non-secure data may be not be storable in secure storage and/or processable by a secure processor or secure portion of a processor. The secure environment may implement rules, e.g. such that components may only access data having the same security flag value. In some cases, the trust levels referred to elsewhere may correspond to the security flag values. As an example, a secure processor (e.g. having an associated security flag value of '1') may access secure data (e.g. having an associated security flag value of '1') but not non-secure data (e.g. having an associated security flag value of '0' or no security flag). In other rule examples, secure components may access secure and non-secure storage or data (e.g. having a respective associated flag value of '1' or '0'), as described above. Setting the security flag values and controlling the access rights in such examples may be implemented using the TrustZone® technology referenced above, for example. Other technologies may be used to implement the secure environment and/or apply the at least one security feature in other examples. Furthermore, other types of security feature may additionally or alternatively be applied in other examples, e.g. in accordance with a technology used to implement the secure environment.

As mentioned, the method 100 may involve outputting the modified AR data as non-secure data in examples. Non-secure data may comprise data to which the at least one security feature has not been applied, e.g. in accordance with the implemented secure environment, as described above. For example, outputting the modified AR data as non-secure data may involve writing the modified AR data to non-secure storage (e.g. a storage component to which the at least one security feature has not been applied and which is therefore not within the secure environment). Additionally, or alternatively, the modified AR data may be output to a domain at a lower trust level, e.g. a non-secure domain, for further processing. For example, the non-secure domain may be implemented using different hardware and/or with different security protocols than the secure environment, e.g. in which the method 100 is implemented, as described above. In other cases, however, the modified AR data may be output to a secure domain, e.g. at an equal or higher trust level, for further processing and/or modification. From the secure domain, the further processed/modified AR data may be output to an output device, e.g. also in the secure domain.

In examples, the method 100 may involve obtaining, within the secure environment, sensor data captured by a sensor. For example, as described, one or more sensors and/or a sensor interface may be within the secure environment to allow for vetting of the sensor data obtained therefrom. At least part of the sensor data obtained from the one or more sensors may be outputted to at least one of the augmented reality application or the object recognition system. For example, a cropped version of a captured image may be sent to the object recognition system for performing object recognition on. The object recognition system may be within the secure environment, as described. Outputting at least part of the sensor data to the augmented reality application, e.g. outside the secure environment, may involve outputting a copy of the sensor data that has at least part of the sensor data obfuscated. For example, the copy of the sensor data being sent to the AR application may have private or sensitive information such as bank card numbers, personal details, etc. obfuscated (e.g. redacted, obscured, removed). The obfuscation may be based on object recognition performed on the sensor data, e.g. by the object recognition system, in the secure environment.

In some examples, at least one of the AR data and the object recognition data, e.g. obtained at items 101 and 102 of the method 100 respectively, is written to secure storage. For example, the original AR data obtained may be stored securely in addition to outputting a modified version of the AR data, e.g. as non-secure data.

In examples, at least one of the AR data and the object recognition data is encrypted, e.g. when written to secure storage or transferred between components at the first trust level or within the secure environment. For example, an encryption scheme may be implemented such that the data is encrypted before being stored or transferred. The data may be encrypted by applying an encryption algorithm thereto. In some examples, a hash function (e.g. a cryptographic hash function) may be applied to the data. Encrypting and/or hashing the data may ensure that the data has not been tampered with when it is obtained, e.g. for further processing. Encryption and/or hashing may be applied to any data outputted from the secure environment, e.g. by the AR system, to similarly ensure that the outputted data (e.g. non-secure modified AR data) has not been modified prior to receipt by an external device such as a display device.

Figure 3:
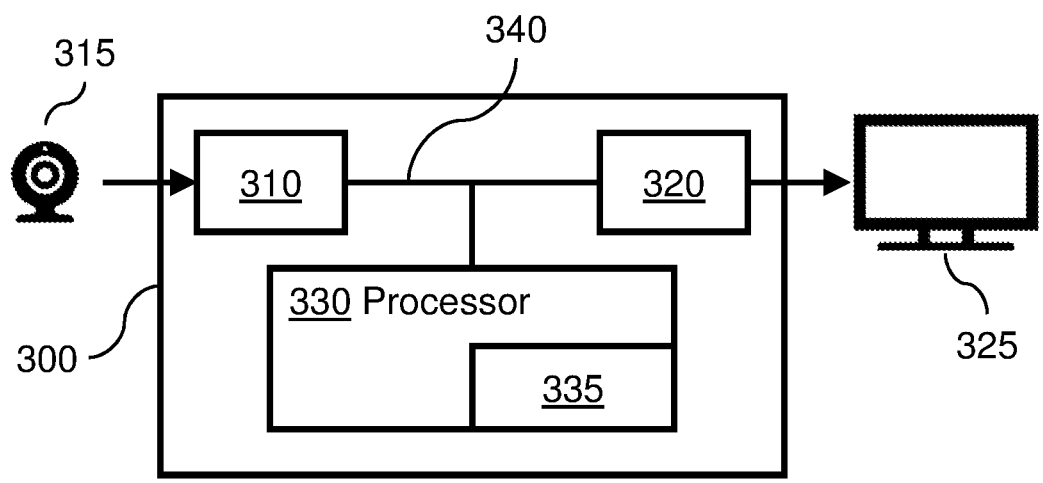
FIG. 3 shows schematically a computing device according to examples.

FIG. 3 shows an example computing device 300, e.g. which may be arranged to implement an augmented reality system like that described with reference to FIG. 2, and/or use the data processing methods described with reference to FIG. 1. Examples of a computing device 300 include a personal computer, a laptop, a smartphone, an AR headset (such as AR glasses), an AR compute unit, and an on-board computer device which may be coupled to or mounted within a vehicle such as a car.

The computing device 300 includes a secure sensor interface 310 to obtain sensor data from one or more sensors 315. The one or more sensors 315 may include one or more of an image sensor, an audio sensor, a depth sensor, or a haptic sensor for example. An image sensor typically includes an array of sensor pixels, which may be any suitable photosensors for capturing images. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS). The image sensor may be arranged to capture image data representative of an image. The image may form part of a video, which is typically a series of images captured sequentially. For example, the image may correspond to a frame of a video. An audio sensor, e.g. a microphone, is typically configured to convert air pressure variations of a sound wave into an electrical signal. Examples include a dynamic microphone, a condenser microphone and a piezoelectric microphone.

In examples where the at least one sensor 315 includes an image sensor, the secure sensor interface 310 may include a camera serial interface (CSI). The secure sensor interface, e.g. CSI, may be part of, or communicatively coupled to, a digital signal processor, e.g. an image signal processor (ISP). An ISP may perform initial processing of image data to prepare the image data for display as part of the AR experience. For example, the ISP may perform saturation correction, renormalization, white balance adjustment and/or demosaicing, although this is not to be taken as limiting. The ISP may also be secure, e.g. located within the secure environment, along with the secure sensor interface 310. Intermediate data generated by the ISP, e.g. based on the image data transferred thereto from the image sensor 315, and image data output by the ISP may be secure. For example, components without appropriate access rights may not access such secured intermediated data and/or output image data. In examples where the at least one sensor 315 includes an audio sensor, the secure sensor interface 310 may include an audio interface. The secure audio interface may be part of, or communicatively coupled to, a digital signal processor (DSP). The DSP may perform initial processing of the sensor data, as described above for the ISP case. As also described, intermediate data generated by the DSP and data output by the DSP may be secure. For example, components without appropriate access rights may not access such secured intermediated data and/or output data.

In examples, the at least one sensor 315 may be vetted by the computing device 300, e.g. at the secure sensor interface 310, to ensure that the sensor data being received therefrom is as expected. For example, test sensory information may be instanced in the real-world environment for the at least one sensor 315 to capture and send to the computing device 300, e.g. at the secure sensor interface 310 as described. The obtained sensor data as captured by the at least one sensor 315 may be compared to reference sensor data, corresponding to an expected response to the test sensory information, to determine whether the at least one sensor 315 is working properly and/or whether communication between the computing device 300 and the at least one sensor 315 is working properly.

The computing device 300 also includes a secure output interface 320 to control an output device 325. The secure output interface 320 may issue commands to control the output device 325, for example. In examples, the secure output interface 320 comprises a display interface, e.g. a display serial interface (DSI), to control a display device. The display interface 320 may be configured to output display data, comprising image data, to the display device 325, which may be an electronic display, e.g. a light-emitting diode (LED), organic light-emitting diode (OLED), micro LED, liquid crystal (LCD), or light field display. In some examples, the output device 325 comprises an audio output device, e.g. a speaker or headphones. For example, the secure output interface 320 may control the audio output device 325 via audio data, e.g. the modified AR data may comprise augmented audio data as described, which is outputted by the secure output interface 320 for playing by the audio output device.

The computing device 300 also has at least one processor 330 comprising at least one secure processor portion 335 configured to perform secure data processing operations. In examples, the at least one processor 330 includes a central processor unit (CPU). However, the computing device 300 may include other or alternative processors such as a microprocessor, a general purpose processor, a graphics processing unit (GPU), a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The computing device 300 may also or alternatively include a processor implemented as a combination of processors, e.g. a combination of a DSP and a microprocessor, a plurality of microprocessors, one or more microprocessors in conjunction with a DSP core, or any other such configuration. Multiple processors of the computing device 300 may be combined as a System on a Chip (SoC) or onto multiple SoCs to form one or more application processors in some examples.

In certain cases, the at least one processor 330 may additionally or alternatively include at least one neural network accelerator. A neural network accelerator is, for example, a processor dedicated to implementing at least classification of data using a neural network. The at least one neural network accelerator may be a neural network accelerator (such as a single or sole neural network accelerator) configured to implement a neural network or a plurality of neural networks, in some examples. In some examples, in which a plurality of neural networks is implemented, each neural network may be implemented by a corresponding neural network accelerator.

The components of the computing device 300 in the example of FIG. 3 are interconnected using a systems bus 340. This allows data to be transferred between the various components. The systems bus 340 may be, or include, any suitable interface or bus. For example, an ARM® Advanced Microcontroller Bus Architecture (AMBA®) interface, such as the Advanced eXtensible Interface (AXI), may be used. The computing device 300 may include further components not shown in FIG. 3, e.g. storage. The storage may be a random-access memory (RAM) such as DDR-SDRAM (double data rate synchronous dynamic random-access memory). In other examples, the storage may be or include a non-volatile memory such as Read Only Memory (ROM), non-volatile random-access memory (NVRAM), or a solid-state drive (SSD) such as Flash memory. The storage in examples may include further storage devices, for example magnetic, optical or tape media, compact disc (CD), digital versatile disc (DVD) or other data storage media. The storage may be removable or non-removable from the computing device 300. The storage may be arranged to store sensor-originated data, e.g. image data representative of at least part of an image, which may be received via the secure sensor interface 310. In some examples, the computing device 300 of FIG. 3 also includes a dynamic memory controller (DMC) which may be used to control access to the storage of the computing device 300.

In examples, the at least one processor 330 (e.g. neural network accelerator, GPU, CPU, and/or DSP) may support a single security domain. For example, the at least one processor 330 may remain in the secure environment. In such cases, the computing device 300 may comprise a further at least one processor which remains outside the secure environment, e.g. in a non-secure domain. For example, the at least one processor 330 may be partitioned, such that a secure partition remains within the secure environment and a non-secure partition remains outside the secure environment. In certain cases, one or more individual processors 330 of the at least one processor 330 may be partitioned into respective secure and non-secure partitions. In other examples, the at least one processor 330 may be switchable between a secure domain (e.g. the secure environment) and a non-secure domain (e.g. outside the secure environment).

In examples, the computing device 300 comprises a trusted execution environment which includes the secure sensor interface 310, the secure output interface 320, and the at least one secure processor portion 335. The trusted execution environment may be implemented using Trust-Zone® technology as described previously.

The secure data processing operations performed by the at least one secure processor portion 335 include obtaining augmented reality data, output by an augmented reality application operating at a lower trust level than the at least one secure processor portion 335. As described, the augmented reality data is useable for modifying a representation of a real-world environment for a user of the computing device. The augmented reality application may correspond to the augmented reality application 205 described in examples above with reference to FIG. 2. In examples, augmented reality data may be obtained from a plurality of augmented reality applications. In such cases, obtained augmented reality data may be prioritized. For example, first augmented reality data obtained from a first augmented reality application, e.g. navigation information obtained from a navigation program, may be prioritized over second augmented reality data obtained from a second augmented reality application, e.g. a video game program. The prioritization of the first augmented reality data over the second augmented reality data may determine how the different AR data are presented to the user. For example, the at least one secure processor portion 335 may determine that the prioritized first augmented reality data (e.g. navigation virtual objects) should be layered over the second augmented reality data (e.g. game virtual objects) such that the former is more prominent than the latter when output to the user. Thus, the secure data processing operations performed by the at least one secure processor portion 335 may include determining how first and second augmented reality data, obtained from first and second augmented reality applications respectively, should be composited together.

The secure data processing operations performed by the at least one secure processor portion 335 also include obtaining object recognition data determined by an object recognition system operating at a higher trust level than the augmented reality application 205. The object recognition system may correspond to the object recognition system 210 described in examples above. The object recognition data is determined by the object recognition system based on the representation of the real-world environment, as described. The object recognition data comprises an indication of an object belonging to a predetermined class of objects being present in the real-world environment, also as described above.

In examples where the computing device 300 implements a trusted execution environment, the object recognition system may be included in the said trusted execution environment. In some cases, the computing device 300 itself includes the object recognition system. For example, instead of the object recognition system being external to the computing device 300 and sending the determined object recognition data thereto, the object recognition system may be part of the computing device 300 and determine the object recognition data thereat.

The secure data processing operations performed by the at least one secure processor portion 335 include triggering modification of the augmented reality data, based on at least one of the object recognition data or monitoring data related to the user, and outputting the modified augmented reality data via the secure output interface 320. Examples of monitoring data are described above.

Triggering modification of the augmented reality data may involve sending a request to the augmented reality application to modify the augmented reality data based on the object recognition data. For example, as previously described, the AR application may modify the AR data using the object recognition data; the secure data processing operations performed by the at least one secure processor portion 335 may then include obtaining the modified AR data from the AR application. The AR application may modify the AR data in any of the ways previously described, e.g. by inserting a virtual object into the AR data to generate the modified AR data or by modifying a virtual object already present in the AR data. For example, where the virtual object is a virtual image object, this may involve increasing a transparency of the virtual image object, removing the virtual image object completely, swapping the virtual image object for another virtual image object, converting a visual representation of the virtual image object to a wireframe model, decreasing a size of the virtual image object, and/or altering a location of the virtual image object. As described, where the virtual object is a virtual audio object, the modifying may involve reducing a volume of the virtual audio object, modifying a frequency of the virtual audio object, and/or modifying a source location of the virtual audio object.

In certain cases, the initial AR data output by the AR application may be attempting to destructively change the representation of the real-world environment, e.g. by removing features or objects from the representation of the real-world environment. Thus, the request sent to the AR application may include an indication to the AR application that the recognized object should be perceivable to the user when the AR environment is generated, and that the initial AR data intended by the AR application to be used to generate the AR environment conflicts with this. For example, the initial AR data may remove or obscure a speed sign from a generatable AR environment for a driver of a vehicle, and the request may indicate to the AR application that the speed sign should be visible to the driver. The AR application can therefore modify the AR data to at least partially reverse the removal or obscuration of the recognized object (e.g. the speed sign in this example) in response to the request.

Additionally, or alternatively, triggering modification of the augmented reality data may involve (actively) modifying the augmented reality data. In such cases, the modification of the AR data, in any of the ways described herein, may be done as part of the secure data processing operations performed by the at least one secure processor portion 335.

The modification of the AR data may also be based on monitoring data relating to the user of the AR system in some cases, as described in examples. In such cases, the secure sensor interface 310 may obtain the monitoring data from one or more monitoring sensors. The one or more monitoring sensors may be arranged to monitor the user, for example, as part of a wearable device. Examples of the monitoring data include eye tracking data (e.g. from an eye tracker), motion data (e.g. from a motion sensor) and heart rate data (e.g. from a heart monitor). How the AR data is modified may depend on the monitoring data. For example, the monitoring data may provide information on how aware of a detected object (e.g. hazard) the user is. The AR data can therefore be modified according to a level of user awareness of the recognized object.

Figure 4:
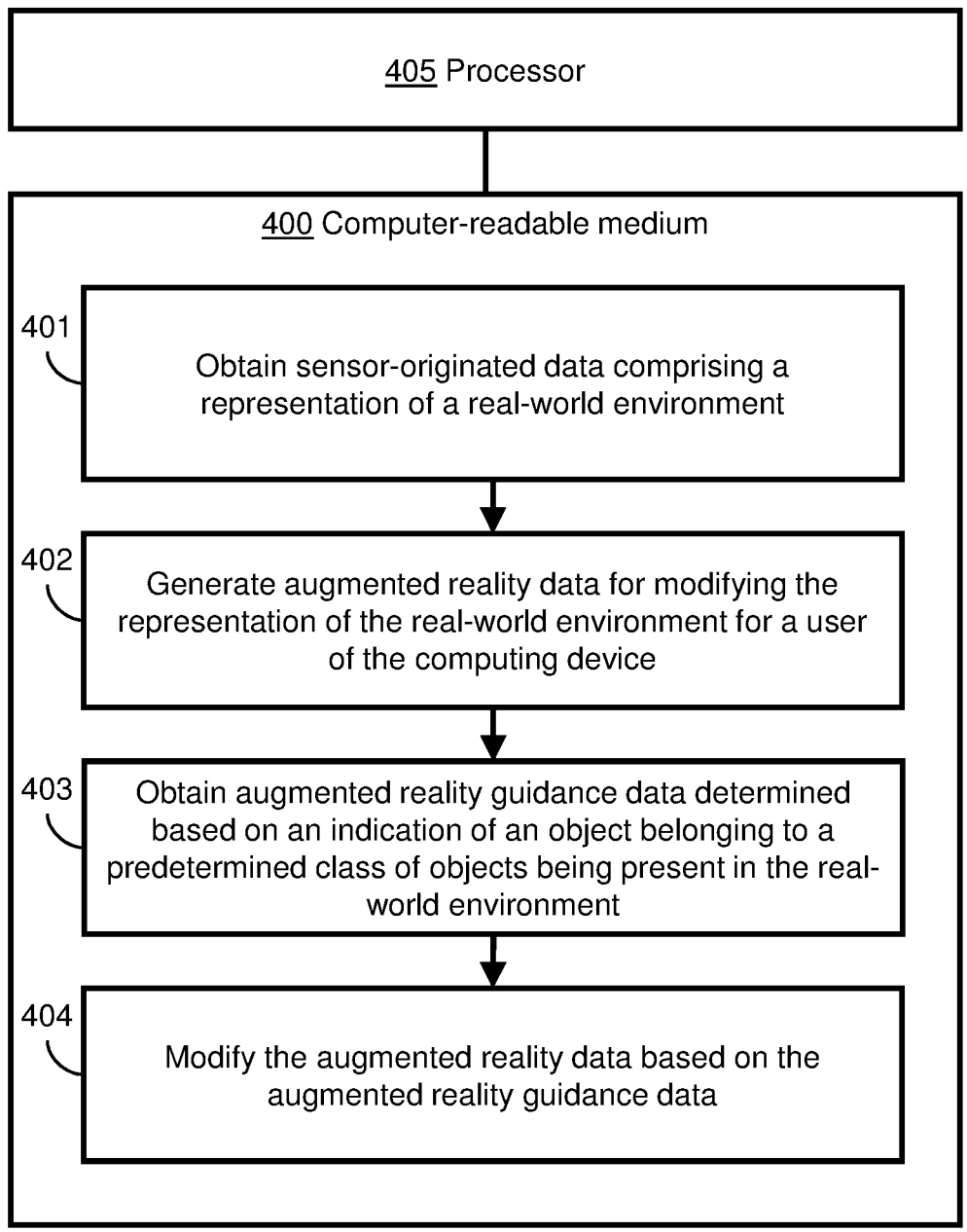
FIG. 4 shows schematically a non-transitory computer-readable medium, comprising computer-executable instructions, according to examples.

FIG. 4 shows an example of a non-transitory computer-readable storage medium 400 comprising a set of computer-readable instructions which, when executed by at least one processor 405, cause the at least one processor 405 to perform a method according to items 401 to 404 described below.

At item 401, the instructions cause the processor 405 to obtain sensor-originated data comprising a representation of a real-world environment. In examples, the instructions at item 401 may cause the processor 405 to store the sensor-originated data in storage. The storage may be volatile, such as a static random-access memory (SRAM), a dynamic random-access memory (DRAM), and/or cache storage. In other examples, the storage may be non-volatile, such as a read-only memory (ROM), a programmable read-only memory (PROM), an erasable programmable read-only memory (EPROM), or a non-volatile random-access memory (NVRAM). The sensor-originated data may thus be obtained by the processor 405 accessing the storage which stores the sensor-originated data.

At item 402, the instructions cause the processor 405 to generate augmented reality data. The generated augmented reality data is useable for modifying the representation of the real-world environment for a user of a computing device, e.g. on which the at least one processor 405 is installed. For example, the augmented reality data may comprise a virtual object, e.g. comprising at least one of audio data or image data, that is insertable into the representation of the real-world environment to generate an augmented reality environment for the user. The virtual object may be overlaid into the representation of the real-world environment, e.g. comprising image and/or audio data, to generate the AR environment, for example. As described previously, a virtual object may be an AR object retrievable from an object library of stored virtual objects, e.g. as part of an AR platform implemented on a user device. The AR platform, such as Apple ARKit™, Google ARCore™ or Google Tango™, implemented on the user device may include an AR engine in the form of one or more software and/or hardware modules installed on the user device, for example.

The virtual object may be represented in the form of corresponding virtual object data. The virtual object may thus be inserted, e.g. overlaid, in the representation of the real-world environment based on the virtual object data corresponding to the virtual object.

In examples, auxiliary data may be useable when inserting the virtual object into the representation of the real-world environment. For example, where the virtual object is insertable into image data, spatial data may be applied to the virtual object data, or vice versa, in order to insert the virtual object at a determined position, orientation and/or scale in the image. In some cases, the virtual object may be insertable at an anchor which corresponds to a position and orientation in a real-world environment. For example, the anchor may define a real-world position and orientation (or "pose"). The anchor may describe a fixed location and orientation in the real world.

In some cases, the generated AR data is useable to modify the representation of the real-world environment by inserting multiple virtual objects into the representation. For example, the multiple virtual objects may be different AR objects retrievable from the object library, as part of the AR platform, as described above. Each virtual object may be represented in the form of corresponding virtual object data. Thus, the generated AR data may be for inserting each virtual object into the representation of the real-world environment based on the virtual object data corresponding to the virtual object.

At item 403, the instructions cause the processor 405 to obtain augmented reality guidance data. The augmented reality guidance data is determined based on an indication of an object belonging to a predetermined class of objects being present in the real-world environment.

For example, a determination that the object belonging to the predetermined class of objects is present in the real-world environment may be made by an object recognition system, as described above in other examples. The object may be a hazard, obstacle or other object of interest in the real-world environment, e.g. a road speed limit sign. In examples, the obtained augmented reality guidance data may indicate, e.g. to an AR application being run on the at least one processor 405 to perform the present method, that the augmented reality data, e.g. generated at item 402, may interfere with the recognized object. The obtained augmented reality guidance data may signal, e.g. to the AR application, that the AR data intended to be displayed to the user could impede perception of the recognized object by the user in the real-world environment. As an example, the augmented reality guidance data may be determined based on an indication of a speed limit sign being present in the real-world environment, e.g. for an AR system being implemented in a vehicle. The AR guidance data may indicate that the virtual object, as intended to be inserted into an image representation of the real-world environment in accordance with the AR data, e.g. generated at item 402, would at least partly obfuscate the speed limit sign when the AR environment is generated for the user.

At item 404, the instructions cause the processor 405 to modify the AR data based on the AR guidance data. For example, the AR data may be modified to at least partially reduce or avoid any impeded perception of the recognized object by the user due to the AR data as applied to the representation of the real-world environment. For example, where the AR data includes a virtual object, modifying the AR data may comprise modifying the virtual object.

In examples, and as previously described, modification of the AR data may be dependent on monitoring data relating to the user of the AR system. The monitoring data may be captured by one or more sensors which are arranged to monitor the user, for example, as part of a wearable device, which could form part of an AR system. Examples of the monitoring data include eye tracking data (e.g. from an eye tracker), motion data (e.g. from a motion sensor) and heart rate data (e.g. from a heart monitor). How the AR data is modified may depend on the monitoring data. For example, the monitoring data may provide information on how aware of a detected object (e.g. hazard) the user is. The AR data can therefore be modified to an extent according to a level of user awareness of the recognized object. The monitoring data may be obtained as part of, or separately to, the AR guidance data described above. For example, in some cases, the AR guidance data is determined based on: the indication of the object belonging to a predetermined class of objects being present in the real-world environment; and monitoring data related to the user of the computing device. In other cases, the monitoring data may be obtained separately to, and complement, the AR guidance data. For example, the monitoring data may be obtained alongside the sensor-originated data by the processor 405, e.g. as part of item 401. Modifying the virtual object may involve increasing a transparency of the virtual object. For example, the virtual object may be made more transparent in the AR scene so that the recognized object, which may be at least partly obscured by the virtual object, can still be seen by the user when the AR data is used to generate and display the AR scene to the user. In some cases, modifying the virtual object may involve removing the virtual object from the AR scene.

Additionally, or alternatively, modifying the virtual object may involve converting a visual representation of the virtual object to a wire-frame model. For example, the virtual object may include surface characteristics such as texture in the AR data. The virtual object may be converted to a wire-frame model by specifying the edges of the virtual object or connecting constituent vertices of the virtual object using straight lines or curves. The surface characteristics of the virtual object may be removed, or at least not displayed, when converting the virtual object to the wire-frame model. Converting the visual representation of the virtual object to a wire-frame model can reduce obfuscation of the underlying recognized object, e.g. in a similar way to increasing the transparency of the virtual object as described.

Additionally, or alternatively, modifying the virtual object may involve decreasing a size of the virtual object. For example, the (relative) size of the virtual object in the scene may be reduced such that more of the scene, e.g. more of the recognized object at least partly obfuscated by the virtual object, can be seen by the user.

Additionally, or alternatively, modifying the virtual object may involve altering a location of the virtual object in the representation of the real-world environment. For example, if the AR guidance data indicates that the virtual object intended to be inserted into an image at least partly obfuscates the recognized object in the image, moving the location of the virtual object can allow at least more of the recognized object to be visible to the user when the AR scene is generated and displayed to the user.

In certain examples, the generated AR data may be attempting to overlay sensory information into the real-world environment destructively, e.g. by removing features or objects from the representation of the real-world environment when the (composite) AR environment is generated for the user. The AR guidance data may indicate that perception of an object belonging to a predetermined class of objects is to be compromised in the generated AR environment. In such cases, modification of the AR data may involve at least partially reversing such destructive overlaying of sensory information which could interfere with perception of the recognized object when the AR environment is generated for the user based on the (modified) AR data.

In examples, an AR application may be executed on the at least one processor 405 to perform the present method. An AR application implementing the method described by the instruction items 401-404, i.e. to modify the AR data generated by the AR application based on obtained AR guidance data, can allow for an improved AR experience compared to an entity external to the AR application overriding the output of the AR application. For example, the present case allows the AR application to self-adjust the AR data being output, for generating an AR environment, based on information contained in the AR guidance data. As previously described, the AR application may have a larger or more refined repertoire of routines for modifying the AR data in response to certain detected environmental conditions involving the recognized object. For example, in cases where the AR data initially generated by the AR application would at least partially remove or obscure the recognized object in the generated AR environment, it may more efficient, and may improve the user experience, if such destructive augmentation of the real-world environment is reversed by the AR application itself. Thus, the modifying of the AR data at the AR application based on the AR guidance data may provide for a smoother or less perceivable modification of the AR data compared to an external system overriding the output of the AR application e.g. by modifying the AR data itself or blocking at least part of the AR data from being output in, e.g. superimposed onto, the composite view.

The computer-readable instructions may be retrieved from machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random-access memory (RAM), a read-only memory (ROM), an erasable programmable read-only memory, or a portable disc.

The above examples are to be understood as illustrative. Further examples are envisaged. For example, where image and/or audio data is described in the examples with reference to the Figures, e.g. as sensor-originated data, in other examples one or more additional or alternative types of sensor-originated data may be used. For example, at least one of haptic data, somatosensory data, or olfactory data may be used instead of, or in addition to, image and/or audio data. The representation of the real-world environment may be an olfactory representation comprising olfactory data, for example, where the one or more virtual objects in the AR environment comprise computer generated olfactory data.

In some examples, the sensor-originated data may comprise feature data representative of at least one feature of the sensory information. For example, audio data may be processed, e.g. using a neural network, to generate feature maps representative of at least one feature of the sound. The classes of objects when processing audio data may correspond to characteristics of the audio data such as a source of a sound, e.g. a particular person speaking or a kind of vehicle making a sound. Some classes may relate to particular aspects of human speech, for example a language being spoken, a gender of the speaker, or the content of the speech, e.g. particular words or phrases.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method of data processing for an augmented reality system, the method comprising:
    obtaining augmented reality data, output by an augmented reality application operating at a second trust level, for modifying a representation of a real-world environment for a user of the augmented reality system;
    obtaining object recognition data, determined by an object recognition system operating at a first trust level, comprising an indication of an object belonging to a predetermined class of objects being present in the real-world environment, wherein the first trust level comprises a secure environment and the second trust level comprises a less secure environment; and
    triggering modification of the augmented reality data in response to the object recognition data, based on prioritization of the first trust level over the second trust level.

2. The method according to claim 1, wherein the method comprises performing the obtaining of the object recognition data, and the triggering of the modification, in the secure environment.

3. The method according to claim 1, wherein the method comprises outputting modified augmented reality data, generated in response to the triggering of the modification, from the secure environment.

4. The method according to claim 1, wherein the method comprises: obtaining, within the secure environment, sensor data captured by a sensor; and outputting at least part of the sensor data to at least one of the augmented reality application or the object recognition system.

5. The method according to claim 4, wherein outputting at least part of the sensor data comprises outputting a copy of the sensor data, the copy having at least part of the sensor data obfuscated, to the augmented reality application.

6. The method according to claim 1, wherein the augmented reality data comprises at least one of:
    audio data; or
    image data.

7. The method according to claim 1, wherein the representation of the real-world environment comprises at least one of:
    an audio representation; or
    a visual representation.

8. The method according to claim 1, wherein the triggering of the modification of the augmented reality data comprises sending a request to the augmented reality application to modify the augmented reality data based on at least one of the object recognition data or monitoring data related to the user.

9. The method according to claim 8, comprising obtaining modified augmented reality data from the augmented reality application in response to the request.

10. The method according to claim 1, comprising modifying the augmented reality data in response to the triggering of the modification of the augmented reality data.

11. The method according to claim 10, wherein the modifying of the augmented reality data comprises inserting a virtual object into the augmented reality data to generate modified augmented reality data.

12. The method according to claim 11, comprising inserting the virtual object into the augmented reality data at a location corresponding to that at which the object, belonging to the predetermined class of objects, is detected in the real-world environment by the object recognition system.

13. The method according to claim 10, wherein the augmented reality data comprises a virtual image object and wherein the modifying of the augmented reality data comprises modifying the virtual image object by at least one of:
   increasing a transparency of the virtual image object;
   removing the virtual image object;
   converting a visual representation of the virtual image object to a wire-frame model;
   decreasing a size of the virtual image object; or
   altering a location of the virtual image object.

14. The method according to claim 10, wherein the augmented reality data comprises a virtual audio object and wherein the modifying of the augmented reality data comprises modifying the virtual audio object by at least one of:
   reducing a volume of the virtual audio object;
   modifying a frequency of the virtual audio object;
   modifying an audio source location of the virtual audio object; or
   removing the virtual audio object.

* * * * *